Dec. 25, 1934.   P. J. FITZGERALD   1,985,604
COFFEE ROASTER
Filed Dec. 6, 1932   2 Sheets-Sheet 1
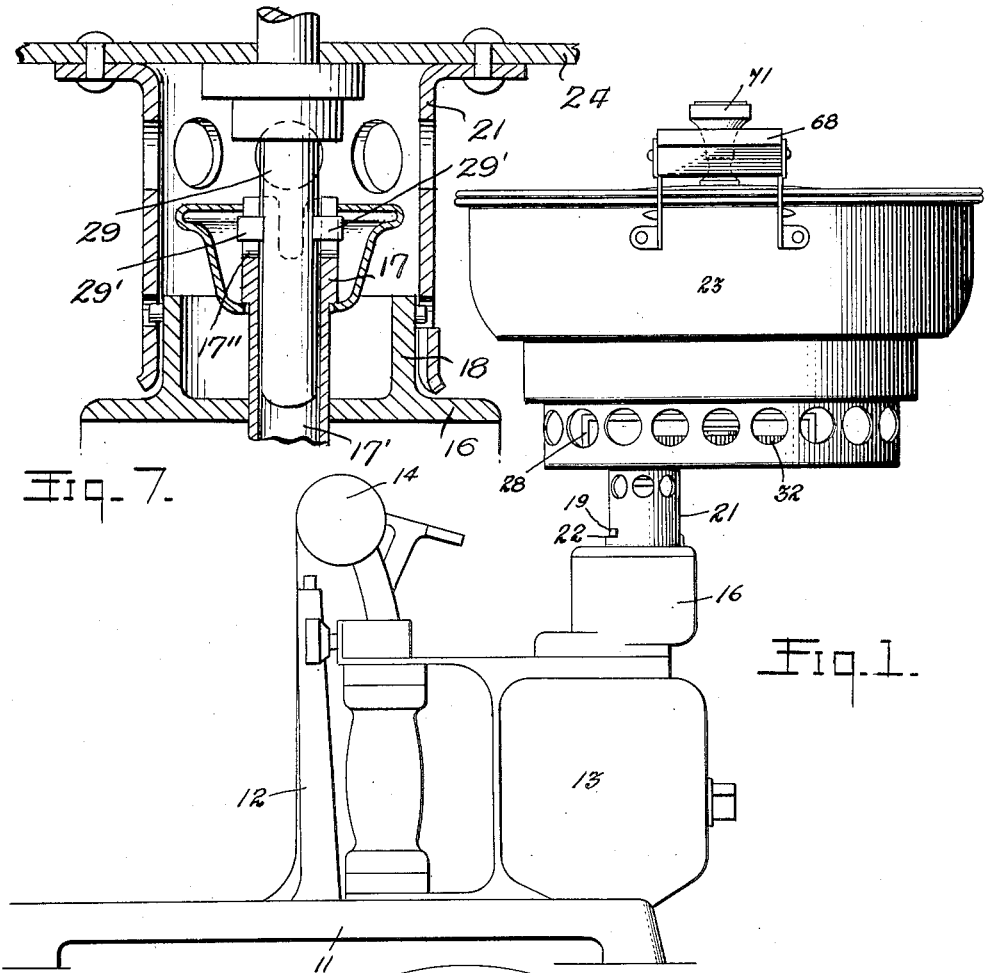
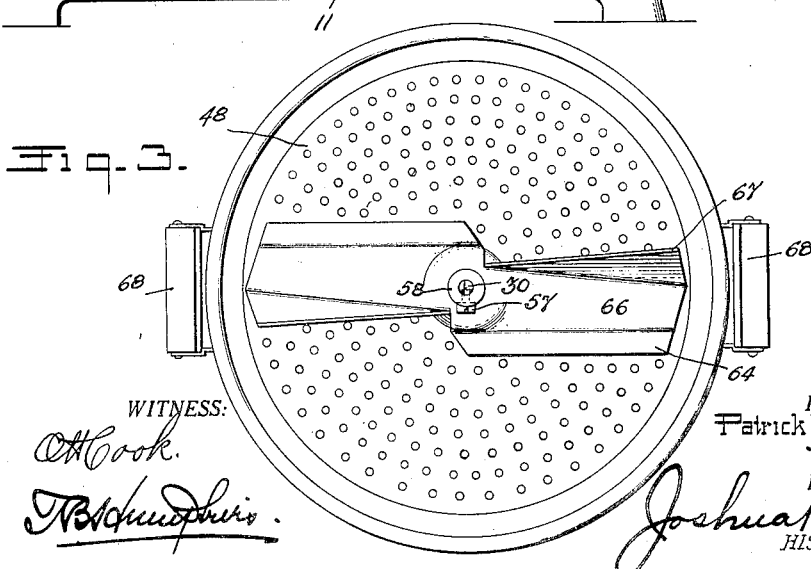

Dec. 25, 1934.   P. J. FITZGERALD   1,985,604
COFFEE ROASTER
Filed Dec. 6, 1932   2 Sheets-Sheet 2
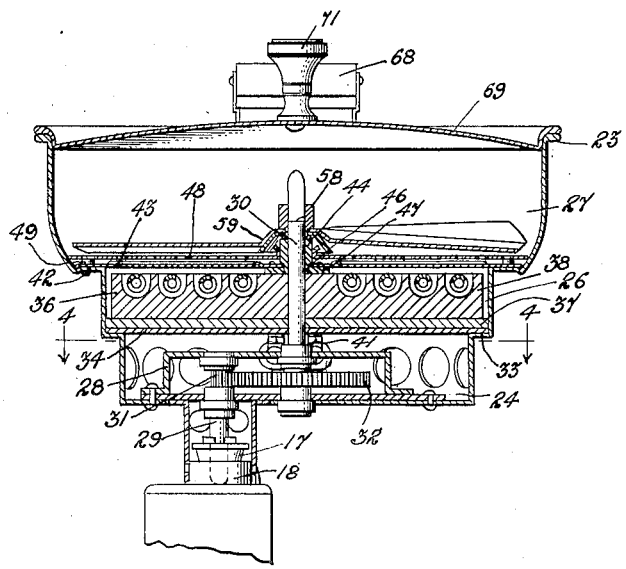
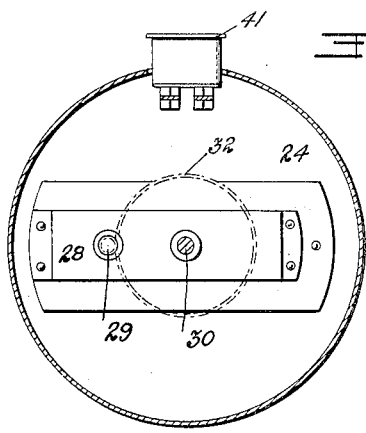
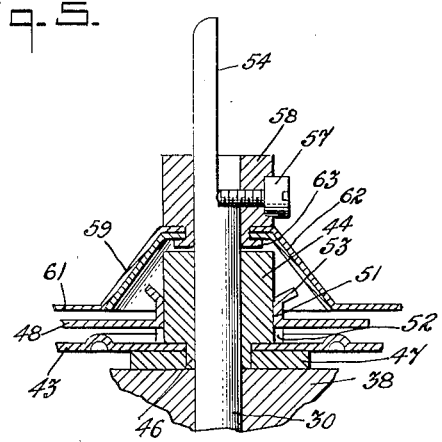
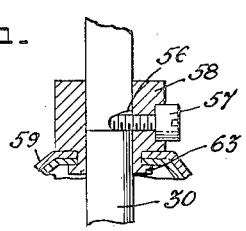
INVENTOR
Patrick J. Fitzgerald
BY
Joshua R. H. Potts
HIS ATTORNEY Patented Dec. 25, 1934

1,985,604

UNITED STATES PATENT OFFICE 1,985,604

COFFEE ROASTER

Patrick J. Fitzgerald, Torrington, Conn., assignor to The Fitzgerald Mfg. Company, Torrington, Conn., a corporation of Connecticut Application December 6, 1932, Serial No. 645,931

3 Claims. (Cl. 34—23)

This invention relates to a roaster and particularly to a roaster for household use and adapted to be connected with a power unit for gently agitating the material to be roasted.

The roaster is shown applied to the electrical utility device shown and described in my application for United States Letters Patent filed April 12, 1932, Serial No. 604,844.

It has been found that with most roasting machines a portion of the material frequently remains in contact with the roasting plate a sufficient length of time to scorch or burn the same, and while in roasting machines classified as "corn poppers", the action of the corn itself tends to keep the material in motion, such is not the case where coffee is being roasted, and as the roaster contemplated is primarily for the purpose of the domestic roasting of coffee, means have been incorporated for insuring the constant movement of the coffee grains during the roasting operation.

The object of this invention is to provide a roaster in the form of an accessory to be applied to a household power unit for efficiently roasting coffee and the like.

According to the invention, the roaster comprises a casing, a heating element, a metallic roasting plate above said heating element, a perforated disk above the roasting plate and forming the bottom of the receptacle in which the material to be roasted is placed, and means gently rotating for intermittently raising all the material in said receptacle from the surface of the disk.

The drawings illustrate an embodiment of the invention and the views therein are as follows:

Figure 1 is a side elevation of my improved roaster applied to the power unit of the application above identified, Figure 2 is a vertical sectional view of the roaster fragmentarily showing a portion of the power unit and the means for coupling the roaster therewith, Figure 3 is a top plan view of the roaster with the cover removed, Figure 4 is a longitudinal sectional view taken on the line 4—4 of Figure 2, Figure 5 is an enlarged fragmentary view of the upper portion of the shaft and associated parts, and shows the agitator in unlocked position on the shaft, Figure 6 is a like fragmentary view showing the agitator locked to the shaft, Figure 7 is a sectional view showing the connection of the roaster element to the driving element and the protecting sleeve in diametrical section.

The power unit here shown is provided with a base 11 having an upright standard 12, a motor 13 pivotally mounted at 14, and a motor gear casing 16, having a collar 18 fixed thereto and surrounding a coupling 17 integral with the shaft of the power unit and provided with a socket. This collar is provided with locking pins 19 and a sleeve 21 on the bottom of the roaster is provided with bayonet slots 22 which, in cooperation with said pins, locks the roaster unit rigidly but removably to said power unit.

The casing 23 is divided into three chambers, the lower 24 being the operating mechanism chamber, the intermediate 26 being the heating chamber, and the upper 27 being the material roasting chamber.

The lower chamber has a stirrup 28 fastened to the bottom of the casing, and this stirrup and the bottom of the casing provide means for locating bearings for a coupling stem 29, the lower end of which is coupled with the power shaft in any approved manner. As for instance as shown it extends into the socket 17″ of the coupling 17 of the power unit and is secured therein to rotate therewith by the slots 17″ which are formed in the end of the coupling 17 and the wings 29′ formed upon the stem 29.

This stem has a toothed portion 31 meshing with a large gear 32 operating on a centrally disposed shaft 30 in bearings fastened in the bottom plate and stirrup, and said shaft extends upward through the heating chamber and terminates in the roasting chamber. The heating chamber 26 is slightly larger than the operating mechanism chamber 24, there being an annular flange 33 between the same and on this flange there is a metal plate 34 forming a floor for the heating element 36.

This heating element may be of any approved type and in the present instance, is shown consisting of insulation disks 37 and refractory material 38 having electrical heating coils 39 which are connected to a source of current through the socket 41.

Another annular flange 42 enlarges the roasting chamber, and on this flange there is a metallic roasting plate 43. This plate is fixedly secured through the annular flange and, therefore, permanently confines the heating element in its chamber.

This roasting plate has a hexagonal hub 44 with a reduced hollow sleeve 46 which passes down through the roasting plate 43 and through a metallic washer 47, and is swaged outwardly to lock said parts together. The hub 44 fits over the shaft 30, but the shaft is free to rotate therein.

Above the roasting plate 43 is a perforated disk 48 which has lugs 49 on the lower face of the same and disposed around the periphery thereof for positioning said disk slightly above said roasting plate. The center of the disk is punched to provide a hexagonal opening 51 and the material along the four sides of said hexagonal opening is bent downwardly, as at 52, to form supports for holding said disk in spaced relation from said roasting plate, while the metal of two diametrically opposed sides is pressed upwardly and outwardly, as at 53, to provide finger gripping portions for removing said disk from said shaft and said roasting chamber.

The upper end of said shaft is provided with a flat side 54 which has a groove 56 at the bottom of the same extending opposite to the direction of rotation of said shaft. This flat portion of the shaft provides means for permitting the end of the screw 57 in the hub 58 of an agitator 59 to pass down to the bottom of said flat portion, so that when the hub is revolved in a direction contrary to the direction of rotation of said shaft, the end of said screw will pass into the groove 56, as shown in Figure 6, and the agitator hub will, therefore, be locked against the rotation of said shaft and prevent it from accidental dislodgment by the material being acted upon.

This agitator is formed as follows:

The hub 58 has a reduced lower portion and onto which agitating wings or blades 61 are attached by a central hole thereon, and said reduced end then passes down through the opening of a truncated hollow cone member 62, where the outer end of said reduced portion is spread out annularly as at 63 to securely lock the parts together.

The wings or blades of the agitator are provided with a horizontal part 64 on the side which first engages the material in the receptacle.

This horizontal portion terminates in an inclined portion 66 which terminates in an upwardly tapered portion 67. The shape of the wing or blade is such that the forward or horizontal portion raises all the material with which it comes in contact from the disk 48 and the material passes up over the other portions of said blades and again falls onto said perforated plate in a changed position.

These blades cover the entire diameter of the perforated disk and when in operation, they raise all the material intermittently therefrom, therefore insuring against the burning or scorching of particles of the material in the roasting chamber.

The casing is provided with handles 68 and with a lid 69 having a central knob 71.

Of course, the roaster illustrated may be modified in various ways without departing from the invention herein set forth and hereafter claimed.

The invention is hereby claimed as follows:

1. A roaster comprising a casing having a heating unit and an agitator shaft therein, a power shaft, coupling means on said roaster for connecting said agitator shaft to said power shaft, reduction gears between said agitator shaft and coupling, a support, and a coupling surrounding said power shaft for connecting and supporting said casing to said support.

2. A roaster comprising a casing having a heating unit and an agitator shaft therein, a power shaft, incasing coupling means on said roaster for connecting said agitator shaft to said power shaft, reduction gears between said agitator shaft and coupling, a support, and a coupling surrounding said power shaft for connecting and supporting said casing to said support.

3. A roaster comprising a casing having a heating unit and an agitator shaft therein, a power shaft, coupling means on said roaster for connecting said agitator shaft to said power shaft, reduction gears between said agitator shaft and coupling, a support, and a slip coupling surrounding said power shaft for connecting and supporting said casing to said support.

PATRICK J. FITZGERALD.